United States Patent
Chesavage

(10) Patent No.: US 10,528,641 B2
(45) Date of Patent: Jan. 7, 2020

(54) ENCODER AND DECODER FOR TRANSMISSION OF COEFFICIENTS TO A NEURAL NETWORK

(71) Applicant: Redpine Signals, Inc., San Jose, CA (US)

(72) Inventor: Jay A. Chesavage, Palo Alto, CA (US)

(73) Assignee: Redpine Signals, Inc., San Jose, CA (US)

( * ) Notice: Subject to any disclaimer, the term of this patent is extended or adjusted under 35 U.S.C. 154(b) by 96 days.

(21) Appl. No.: 15/979,257

(22) Filed: May 14, 2018

(65) Prior Publication Data

US 2019/0347309 A1  Nov. 14, 2019

(51) Int. Cl.
| G06F 7/00 | (2006.01) |
| G06F 17/15 | (2006.01) |
| G06F 7/483 | (2006.01) |
| G06N 3/04 | (2006.01) |

(52) U.S. Cl.
CPC ............ G06F 17/153 (2013.01); G06F 7/483 (2013.01); G06N 3/04 (2013.01)

(58) Field of Classification Search
None
See application file for complete search history.

(56) References Cited

U.S. PATENT DOCUMENTS

| 8,959,130 B2* | 2/2015 | Wegener ............... G06F 7/483 708/203 |
| 9,026,568 B2* | 5/2015 | Wegener ............... G06F 13/28 708/203 |
| 2005/0074061 A1* | 4/2005 | Ribas-Corbera ....... H04N 19/00 375/240.01 |
| 2006/0104356 A1* | 5/2006 | Crinon ............ H04N 21/23406 375/240.12 |
| 2013/0138918 A1* | 5/2013 | Muff .................... G06F 15/7825 712/24 |

* cited by examiner

*Primary Examiner* — David H Malzahn
(74) *Attorney, Agent, or Firm* — File-EE-Patents.com; Jay A. Chesavage

(57) ABSTRACT

A method for efficient transmission of coefficients examines a coefficient list, presents the coefficients as binary floating point representation, and transmits the list of coefficients as a header having an exponent prefix, a fractional suffix, and each coefficient value as an exponent suffix and fractional prefix. A method for reception of coefficients receives a header including an exponent prefix, a fractional suffix, thereafter receiving each value as a sign bit, an exponent suffix and a fractional prefix, reconstituting an approximation of the original value, in sequence, as a sign bit, exponent prefix exponent suffix, fraction prefix, and fraction suffix, thereby greatly reducing the amount of information to be transmitted or received.

15 Claims, 4 Drawing Sheets

Neural Network Initialization

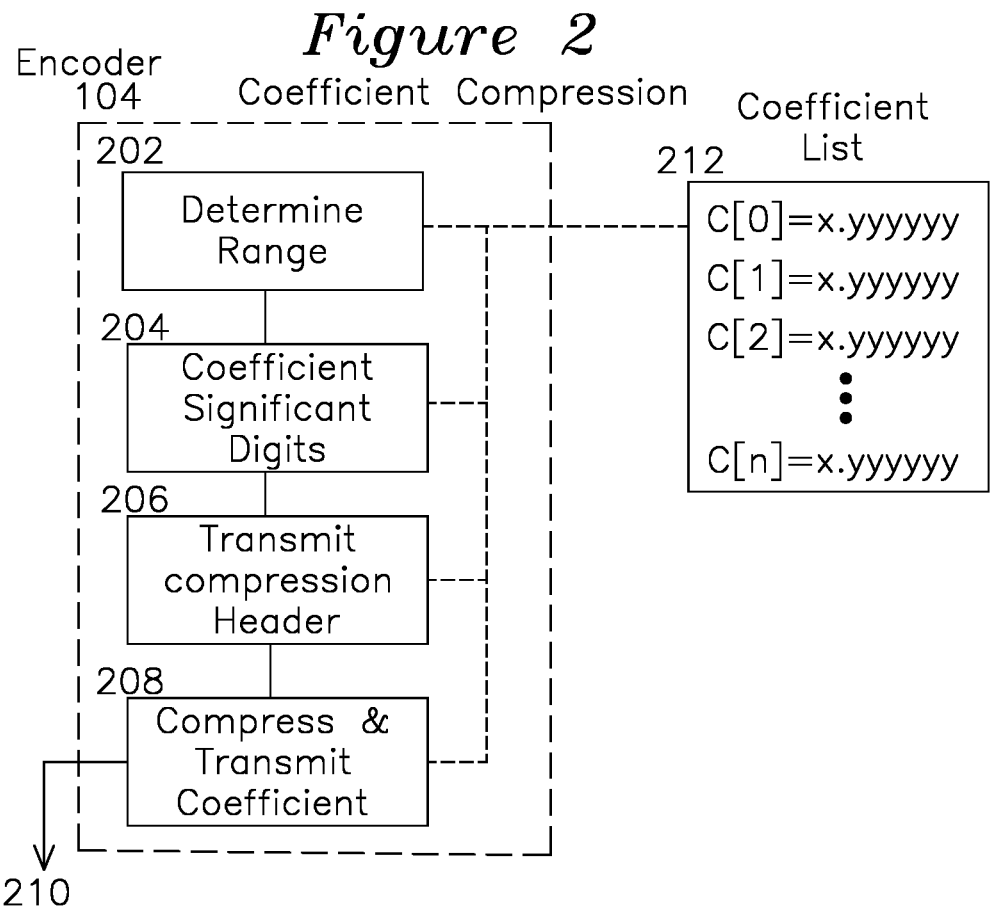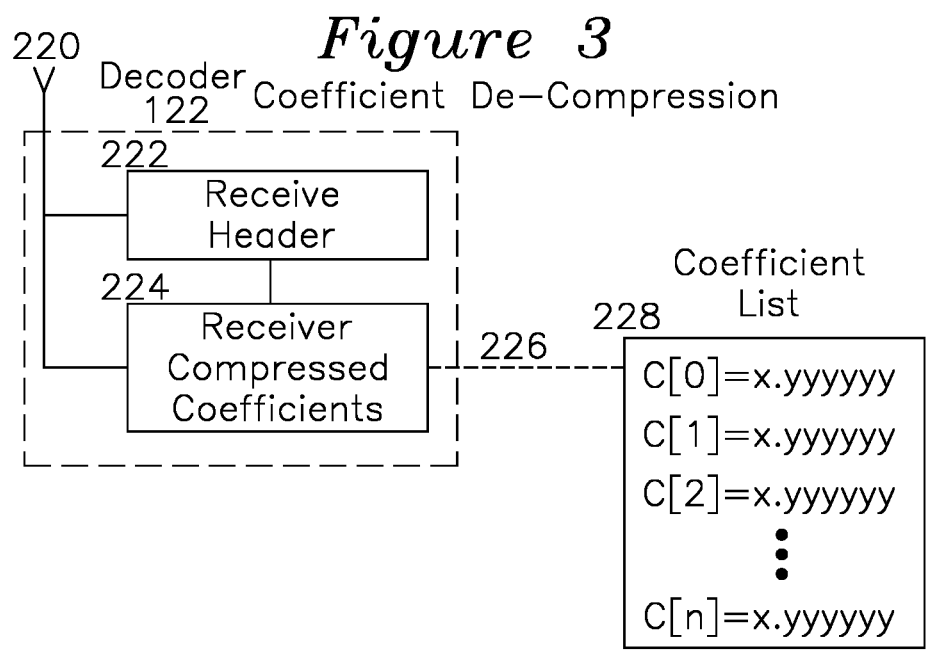

Figure 4
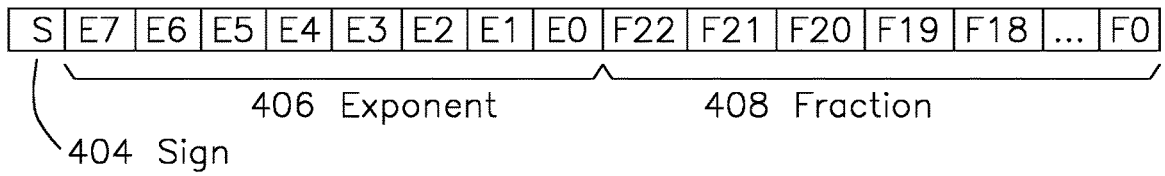
402     Float_32 format
406 Exponent    408 Fraction
404 Sign
Figure 5
$$\text{value} = \underbrace{(-1)^S}_{502} * \underbrace{2^{([E7..E0]-127)}}_{504} * \underbrace{\left(1 + \frac{F22}{2^1} + \frac{F21}{2^2} + \frac{F20}{2^3} + ... + \frac{F0}{2^{23}}\right)}_{506}$$
Figure 6
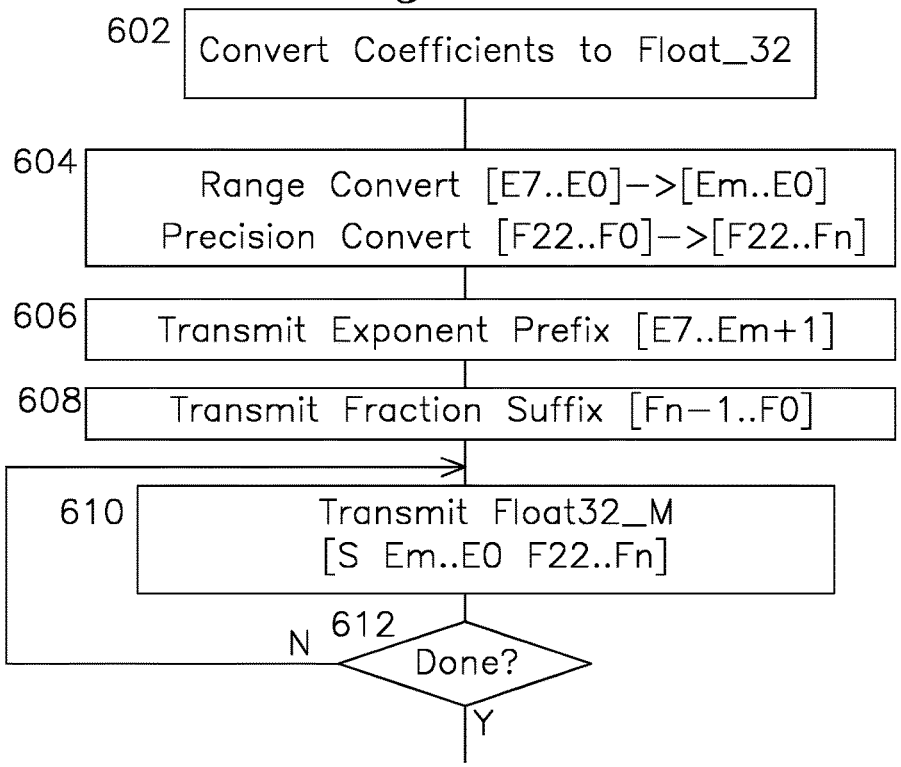

Receive Process

ENCODER AND DECODER FOR TRANSMISSION OF COEFFICIENTS TO A NEURAL NETWORK

FIELD OF THE INVENTION

The present invention relates to a method of encoding and decoding of numerical data for transmission of coefficients to a neural network. In particular, the encoding and decoding is adaptive for the range and precision of a list of coefficients being transmitted for providing a selection of fidelity and numerical accuracy within acceptable limits of the original coefficients to overall compression ratio.

BACKGROUND OF THE INVENTION

A neural network may comprise a plurality of numerical computational machines, each of which may utilize a large number of multiply-accumulate operations. The multiply-accumulate operations typically require a set of numerical coefficients, and the number of numerical coefficients may be stored in a centralized list and communicated to one or more neural network engines which use them.

When the list of coefficients is large, the time required to transmit the coefficients to all of the neural networks is governed by the amount of data to transmit and the data rate of channel. Additionally, it is known that numerical data tends to be difficult to compress using traditional compression algorithms, as the data tends to have high entropy.

For this reason, it is desired to provide a method and apparatus for transmission and reception of numerical data in the form of coefficients across a network to one or more neural network in need of accurate coefficients after decompression and decoding.

OBJECTS OF THE INVENTION

A first object of the invention is a method for compressing a coefficient list by identifying a range of coefficients and resolution of the coefficients, converting the coefficients to a floating point format, identifying a exponent prefix applicable to all of the coefficients as derived from a coefficient range, identifying a fraction suffix applicable to all of the coefficients as derived from a coefficient precision, transmitting a header containing the exponent prefix and fraction suffix, thereafter transmitting, for each coefficient, only a sign bit, an exponent suffix, and fraction prefix.

A second object of the invention is a method for expanding a data stream received from an encoder into a coefficient list where, upon receipt of a header containing an exponent prefix and a fraction suffix, thereafter, for each received sign bit, exponent suffix and fraction prefix, forming a received coefficient comprising, in sequence, the sign bit, the exponent prefix, the exponent suffix, the fraction prefix, and the fraction suffix.

SUMMARY OF THE INVENTION

In one example of the invention, an encoder is operative over a coefficient list. The encoder examines the coefficient list and determines a coefficient range and a required coefficient precision. The coefficients of the list are then converted to a binary floating point format comprising a sign bit, exponent bits, and fraction bits. In one example of the invention, the format is a float_32 format having, in sequence, a sign bit, 8 exponent bits, and 23 fraction bits.

Upon conversion to a fixed floating point format, the range of coefficients is used to determine the number of exponent bits required for the floating point format. In one example of the invention, exponent bits are selected which span the range of the absolute value of the largest exponent to the absolute value of the smallest exponent. Additionally, the precision of the coefficients is determined by examination of the list of coefficients and number of significant digits represented in each coefficient, the precision determining the number of binary digits of the fractional part which must be sent to maintain the precision of the original coefficient.

An encoder is coupled to a list of coefficients to be transmitted. The encoder has a significant digit processor which examines the coefficient list to be transmitted, the coefficient list being converted to a floating point format which includes at least a sign bit, exponent bits, and fractional bits. The encoder examines the coefficients and derives a precision from which a fractional suffix is determined, the encoder examining also the range and establishing an exponent prefix. A header is transmitted which contains the exponent prefix and fractional suffix. For each coefficient to be transmitted, the encoder transmits a serial stream comprising the original sign bit, the remaining bits of the exponent suffix and the remaining bits of the fractional prefix.

A decoder receives a header containing an exponent prefix and a fractional suffix, followed by a stream of data. The decoder separates the stream of data into a sign bit, an exponent prefix, and a fractional suffix, thereafter forming a stream of original coefficients, each coefficient comprising the sign bit, the exponent prefix, the exponent suffix, the fractional prefix, and the fractional suffix.

BRIEF DESCRIPTION OF THE DRAWINGS

FIG. 2 shows a block diagram for a coefficient compression engine.

FIG. 3 shows a block diagram for a coefficient decompression engine.

FIG. 4 shows a float_32 format.

FIG. 5 shows the details of value representation of FIG. 4.

FIG. 6 shows a flowchart for compression of coefficients.

DETAILED DESCRIPTION OF THE INVENTION

Figure 1:
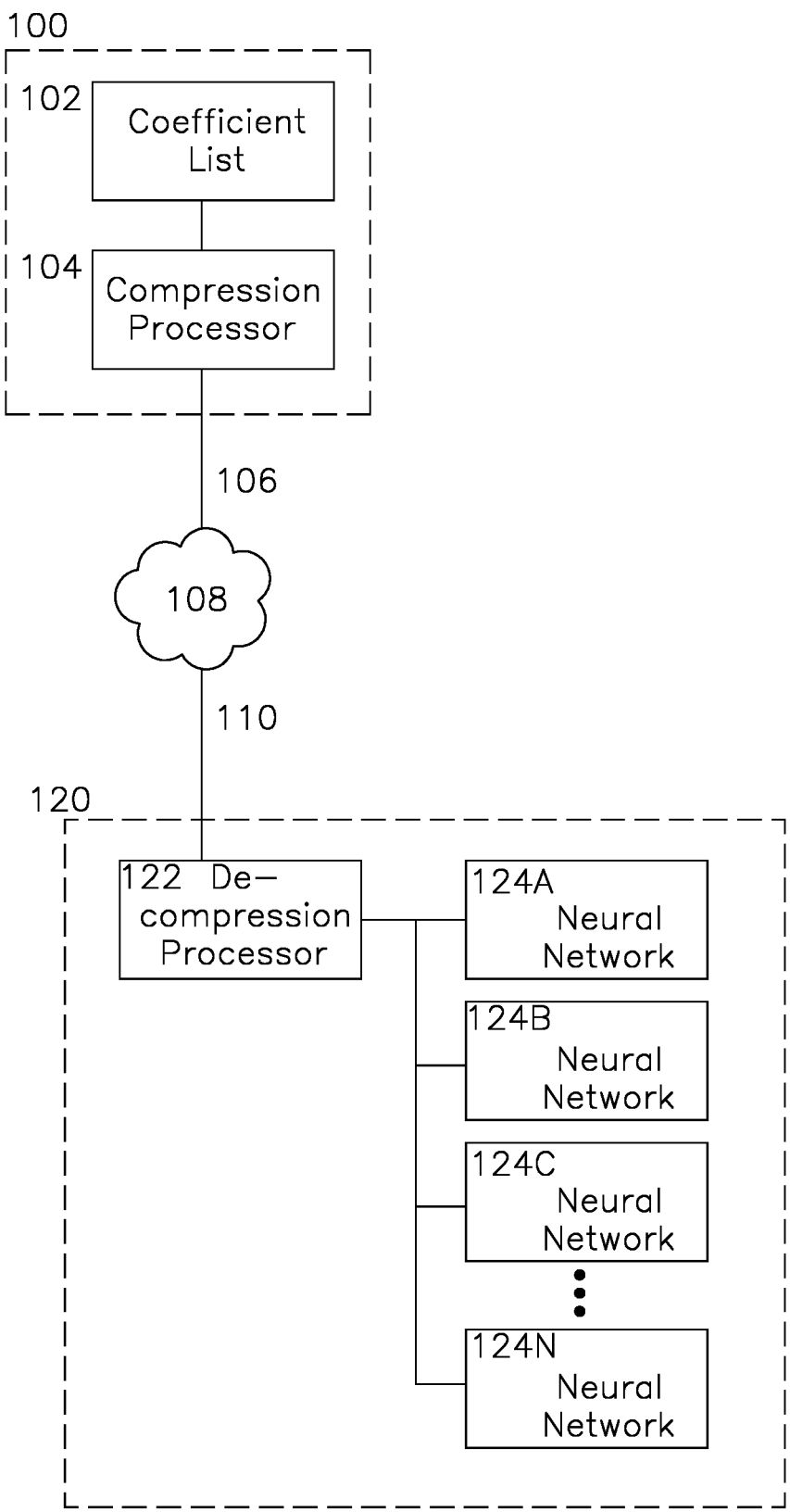
FIG. 1 shows a block diagram of a neural network with coefficient decompression coupled to coefficient storage and a coefficient compressor.

FIG. 1 shows a neural network 120 with a decompression processor (or decoder) 122 which receives initialization coefficients from a coefficient transmitter 100 which comprises a compression processor (or encoder) 104 which is coupled to a list of coefficients 102. The coefficients are transmitted through physical media 106 such as a wireless channel, or through routers of the internet 108, and are received over a channel 110 to decompression engine 122 of the neural network 120. It is desired to increase the throughput of transmission from coefficient transmitter 100 to neural network 120 by efficient compression of the coefficients to reduce the number of bits transmitted per coefficient. The coefficient transmitter 100 compresses the coefficients into a serial stream, transmits them across the medium to decompression processor 122, which provides the coefficients to neural network processors 124A, 124B, 124C through 124N. The coefficients may be shared or unique for each neural network processor, and the header initially transmitted by the compression processor 104 may indicate the particular utilization of the coefficients which follow.

FIG. 2 shows a block diagram of an example coefficient compression encoder 104 (as in FIG. 1) coupled to a coefficient list 212. The coefficient list 212 may be a single list, or a plurality of lists, each set of coefficients with a particular range or precision which may be grouped together prior to transmission. The coefficient list is examined to determine the range of the coefficients, which is used to determine the number of bits of exponent required after a floating point conversion. Coupled to the coefficient list is a range determination engine 202, precision determination engine 204 which determines the number of significant digits required, a processor 206 for transmitting a decompression header which includes transmitting either an exponent prefix and fraction suffix, or sends the number of exponent binary digits and fraction binary digits. Processor 208 performs the compression, which comprises removal of the exponent prefix and fraction suffix from the coefficient being transmitted, and transmitting the sign bit, exponent suffix, and fraction prefix as a binary stream.

FIG. 3 shows a coefficient de-compression engine (decoder) 122, which receives the description header transmitted by the compression processor/encoder 104, extracts the exponent and fractional from the header field, and merges these stationary values with the incoming bit stream to reconstitute the coefficient list as a sign bit, exponent prefix, exponent suffix, fraction prefix, and fraction suffix. When decoded and expanded, each entry is sequentially placed into the coefficient list 228.

FIG. 4 shows the format of a binary float_32 example which is suitable for the present invention, including a sign bit 404 which indicates a positive value when S=0 and a negative value when S=1. The exponent component 406 comprises an exemplar 8 bits of binary data $[E_7 \ldots E_0]$ and the fractional component 408 which is 23 bits of binary data presented as $[F_{22}:F_0]$. FIG. 5 indicates the manner of computation of value from the float_32 format, the sign bit 502 operative as described above, the exponent being expressed two raised to the power $\{[E_7 \ldots E_0]-127\}$ where $[E_7 \ldots E_0]$ is a binary value expressed as base 10. The fractional component $[F_{22} \ldots F_0]$ is operative such that each bit contributes a value the is ½ of the weight of the previous bit value, as shown in FIG. 5 506. By way of example, a coefficient value 0.628138 would be represented by the binary string (bit groups separated for clarity into respective binary sign, binary exponent, and binary fraction components) [0] [01111110] [01000001100110110100111] value= $(+1)*2^{(126-127)}*(1+1/4+1/512+1/1028+ \ldots )=+1*1/2*1.256276=0.6238138$.

FIG. 6 shows a flowchart for compressing and transmitting a list of coefficient values, such as from a list, which may be a linear 1 dimensional list, or a list of lists (multi-dimensional list). In this example, the coefficients may be presented as float_32 values, or converted to float_32 values in step 602. The range of the values is considered for conversion to a domain (exponent range), and the precision of the values is considered for determination of a floating point precision, such as by number of significant digits of the list or sublist in step 604. In one example of the invention, for a given set of coefficients where the greatest number of base 10 coefficient significant digits k results in at least k, or k+1, or k+2 binary digits of the fractional prefix, with the remainder of the fractional prefix digits being 0 and transmitted as part of the header. In another example of the invention, the fractional prefix digits are a fixed value such as 8 bits, which provides on the order of one part per million of coefficient accuracy. The header is transmitted in steps 606 and 608 comprising, in one example of the invention, a header prefix such as the values $[E_7 \ldots E_{m+1}]$ and a fraction suffix such as $[F_{n-1} \ldots F_0]$, where m is determined from the range of coefficients, and n is determined from the precision of the coefficients (such as n=maximum number of coefficient significant digits+2). In these examples, the narrower the domain range, the fewer bits which need to be transmitted, and the lower the precision, the fewer fractional bits which must be transmitted, as the other bits are stationary values suitable for inclusion in the header. For example, if the absolute value of the coefficient values are in the range from $10^{-8}$ to 2, then the exponent will range from [00110010] to [00111110], resulting in the exponent prefix header [E7 ... E4] being transmitted as [0011] whereas the stream of coefficients sent after the header will comprise only the exponent suffix $[E_3 \ldots E_0]$ transmitted for each value. If the precision of the coefficient value to be transmitted requires 6 significant digit, then the first 7 or 8 bits of the fraction may be transmitted in the stream of coefficients which follow the header, for example $[F_{22} \ldots F_{13}]$, and the remainder of the fraction part $[F_{12} \ldots F_0]$ previously sent as a header fraction suffix. In this manner, the header comprises an exponent prefix $[E_7 \ldots E_{m+1}]$ which is transmitted once for a coefficient list, a header fractional suffix $[F_{n-1} \ldots F_0]$ transmitted as a string of 0s or as an indication of the number of 0s to append to the fraction part which is received, the header fractional suffix also only transmitted once with respect to the group of coefficients which are subsequently encoded and transmitted.

The stream of data comprising the encoded/compressed coefficients thereby are transmitted as a stream of Sign bit, Exponent $[E_m \ldots E_0]$, and fraction $[F_{22} \ldots F_n]$, one for each coefficient. In the above example of coefficients less than +/−2 but greater than $10^{-8}$, and 6 significant digits, the exponent prefix $[E_7 \ldots E_4]$ and fraction suffix $[F_{12} \ldots F_0]$ are transmitted once, so the compression ratio is approximately sign (1 bit) plus exponent suffix (4 bits) plus fraction prefix (10 bits), resulting a compression ratio of 17/32=53% while preserving one part in a million or less of coefficient deviation for this example.

Figure 7:
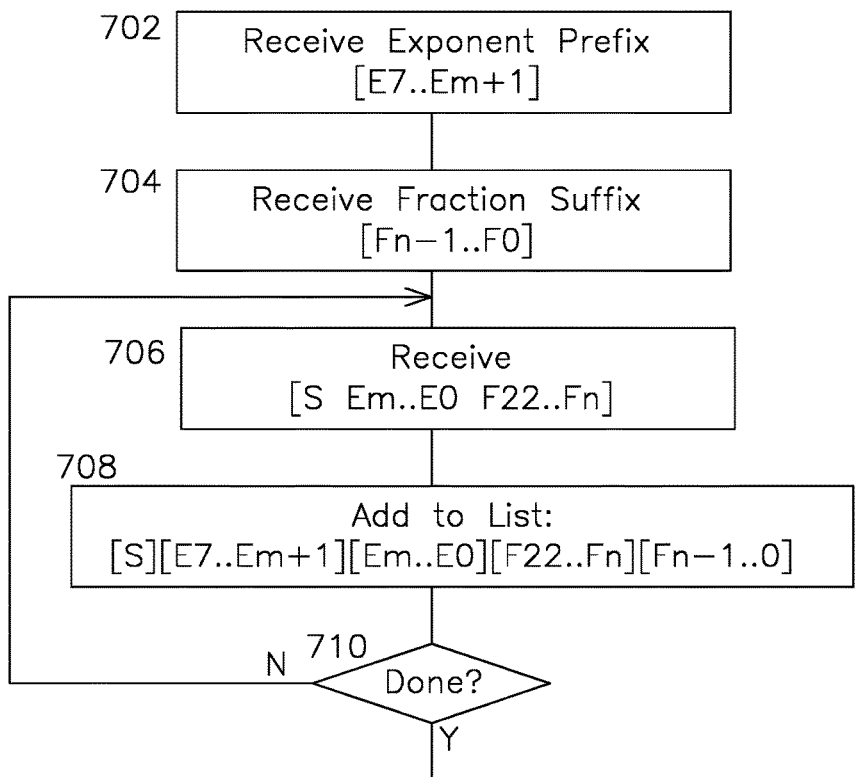
FIG. 7 shows a flowchart for decompression of coefficients.

FIG. 7 shows a flowchart for the receive process, whereby the exponent prefix $[E_7 \ldots E_{m-1}]$ 702 and fraction suffix $[F_{n-1} \ldots F_0]$ are received as a one-time header for a particular coefficient list, and each coefficient received as $[S][E_m \ldots E_0][F_{22} \ldots F_n]$ is reconstituted to its original value $[S][E_7 \ldots E_0][F_{22} \ldots F_0]$ using the header information previously sent, continuing until the last value is received in step 710.

Figure 8:
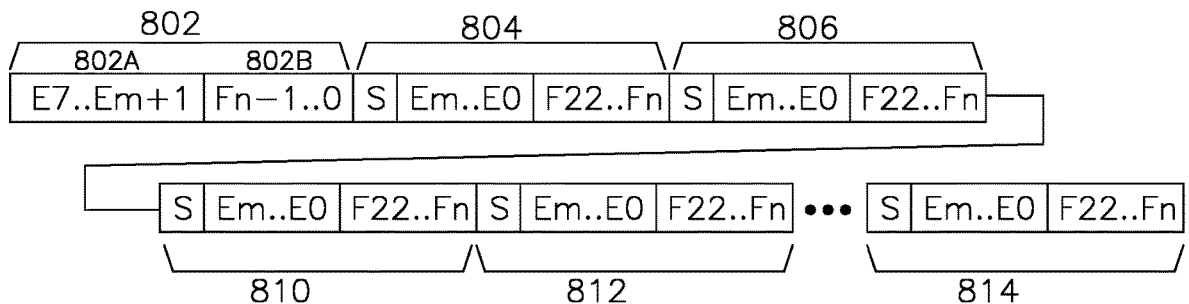
FIG. 8 shows a diagram for coefficients transmitted as a header followed by encoded coefficients.

FIG. 8 shows a sequence of transmission of encoded data, where header 802 is transmitted first, followed by encoded data 804, 806, 810, 812 and 814.

One difficulty in compression of a range of values is that the typical coefficients used in neural network processing may span a relatively small numerical range, such as −5.0 to +5.0, whereas the number of digits required for an exponent becomes larger as the value to be saved gets smaller. For example, the float_32 exponent for 0.1 is [01111011], the float_32 exponent for $10^{-4}$ is [01110001] (providing an exponent prefix of 0111), and the float_32 exponent for $10^{-8}$ is [01100100] (an exponent prefix of 011), and the float_32 exponent for $10^{-32}$ is [00010100] (an exponent prefix of 0).

As is clear from these examples, as the coefficient gets smaller, approaching 0, the number of exponent prefix digits able to represent the range of exponents undesirably shrinks, particularly for values approaching 0. However, the coefficient values 0.0 (and 1.0) are common feedback coefficient values for use in neural networks. In one example of the invention, the encoder uses a specific value for $[S][E_m \ldots E_0][F_{22} \ldots F_n]$ (such as all 0s) to encode the coefficient 0, and includes that association in the header field 802. The decoder which receives this association, upon finding the example all 0 field delivered as encoded data, maps this to the full float_32 coefficient 0. In order to remove ambiguity, the input value $[S][E_m \ldots E_0][F_{22} \ldots F_n]$ which has all 0s after encoding would be incremented by. Each commonly used value which would reduce the range of exponent prefix may similarly be used.

In this manner, the header part 802 may include an exponent prefix field, a fraction suffix field, an optional length field, and one or more optional remapping fields for commonly used values such as 0. In one example of the invention, header 802 contains exponent prefix field 802A and fraction suffix field 802B as previously described. In another example of the invention, header 802 contains additional fields, including one or more of:

a field indicating the number of subsequent encoded data fields 804, 806, . . . 814;

one or more a lookup translation values presented as an association between a particular $[S][E_m \ldots E_0][F_{22} \ldots F_n]$ and a value V to be decoded.

In an example of the invention for encoding coefficients, the process for encoding the stream shown in FIG. 8 includes the steps of identifying the range of coefficients to be transmitted, identifying the precision of the coefficients to be transmitted, identifying special association coefficients (such as 0.0) with a particular encoded value, verifying that the particular encoded value does not correspond to an encoded value which is not a special association, incrementing the fractional part if so to avoid the ambiguity on transmission, preparing and transmitting the header value which may include the exponent prefix, fraction suffix, optional association fields, optional length field for number of encoded values which follow, and the encoded values themselves.

In an example of the invention for decoding coefficients from the stream shown in FIG. 8, the process includes reading the header, extracting the header fields which may include the exponent prefix, fraction suffix, an optional length field, any association fields, thereafter receiving the encoded values, for each particular encoded value received, substituting the special coefficient value for the particular encoded value received, and for all other encoded values comprising a sign, exponent suffix and fraction prefix, forming coefficients by concatenating the received sign value with the received header exponent prefix, received exponent suffix, received fraction prefix, and received header fraction suffix for each received encoded coefficient.

The particular examples given are for understanding the invention rather than limiting the scope to the examples given. The header may be transmitted as stationary values of the exponent prefix and fractional suffix components, or they may be transmitted as an index into a table of values to be used for this purpose. The invention may be practiced many different ways and in different combinations of passcode modifications, as described in the claims which follow.

I claim:

1. A method for transmission of a list of coefficients, each said coefficient comprising a sign, an exponent, and a fraction, the method comprising:
    for a given precision, determining a number of significant bits;
    determining a range of values from the list of coefficients;
    forming an exponent prefix from the range of values, and forming a fraction suffix from the precision;
    transmitting a header comprising at least the exponent prefix and fraction suffix;
    for each coefficient, transmitting:
        the sign;
        an exponent suffix comprising the exponent without the exponent prefix part,
        a fraction prefix comprising the number of significant bits of the most significant bits of the fraction.

2. The method of claim 1 where said sign is 1 bit, said exponent is 8 bits, and said fraction is 23 bits.

3. The method of claim 1 where said sign is 1 bit, said exponent is 11 bits, and said fraction is 52 bits.

4. The method of claim 1 where the number of bits of said fraction prefix is at least the largest number of significant bits of the coefficients of said coefficient list.

5. A method for decoding a stream of data preceded by a header into a list of coefficients, the method comprising:
    extracting from the header an exponent prefix and a fraction suffix;
    extracting from the stream of data a plurality of values, each value having:
        a sign bit;
        an exponent suffix;
        a fraction prefix;
        forming a coefficient in sequence from: said sign bit, said exponent prefix, said exponent suffix, said fraction prefix, and said fraction suffix;
        adding said formed coefficient to said list of coefficients.

6. The method of claim 5 where said exponent prefix and said exponent suffix are a total of 8 bits in length.

7. The method of claim 5 where said fraction prefix and said fraction suffix are a total of 23 bits in length.

8. An encoder for encoding a list of coefficients, each coefficient having a sign bit, an exponent, and a fraction, the encoder comprising:
    a range processor for determining an exponent prefix;
    a precision processor for determining a fraction suffix and a number of significant digits k;
    a header transmitter sending the exponent prefix and fraction suffix;
    a compression processor, for each coefficient in said list of coefficients:
        transmitting the sign bit;
        removing the exponent prefix from the coefficient exponent and transmitting a remaining exponent suffix;
        transmitting the first k bits of the fraction.

9. The encoder of claim 8 where said coefficients are float_32 coefficients.

10. The encoder of claim 8 where said k is either the number of significant bits of a coefficient of said list, or k is 1 or two greater than the number of significant bits of a coefficient of said list.

11. The encoder of claim 8 where a values smaller than $10^{-8}$ are replaced by $10^{-8}$.

12. A decoder for decoding a stream of data preceded by a header containing an exponent prefix and a fraction suffix and forming a list of coefficients, the decoder comprising:
- a header decoder for extracting an exponent prefix and a fraction suffix from a header;
- the apparatus having a receive decoder, the receive decoder separating said stream of data into segments, each segment comprising a sign bit, an exponent suffix, and a fraction prefix;
- for each segment, the receive decoder forming a coefficient from the sequence of:
  - said sign bit;
  - said exponent prefix;
  - said exponent suffix;
  - said fraction prefix;
  - said fraction suffix;
- the receive decoder placing each coefficient into said coefficient list.

13. The decoder of claim 12 where said exponent prefix and said exponent suffix is 8 bits or 11 bits in total length.

14. The decoder of claim 12 where said fraction prefix and said fraction suffix is 23 bits or 52 bits in length.

15. The decoder of claim 12 where said coefficient is a float_32 value.

* * * * *